Dec. 12, 1939.  J. R. HOGE ET AL  2,182,986
METHOD AND AUTOMATIC DEVICE FOR SEALING GLASS BLOCK HALVES TOGETHER
Filed Oct. 31, 1936  5 Sheets-Sheet 3

INVENTORS.
J. R. Hoge.
L. D. Soubier
L. O. Mankin
BY
Rule & Hoge
ATTORNEYS.

Dec. 12, 1939.   J. R. HOGE ET AL   2,182,986
METHOD AND AUTOMATIC DEVICE FOR SEALING GLASS BLOCK HALVES TOGETHER
Filed Oct. 31, 1936   5 Sheets-Sheet 4
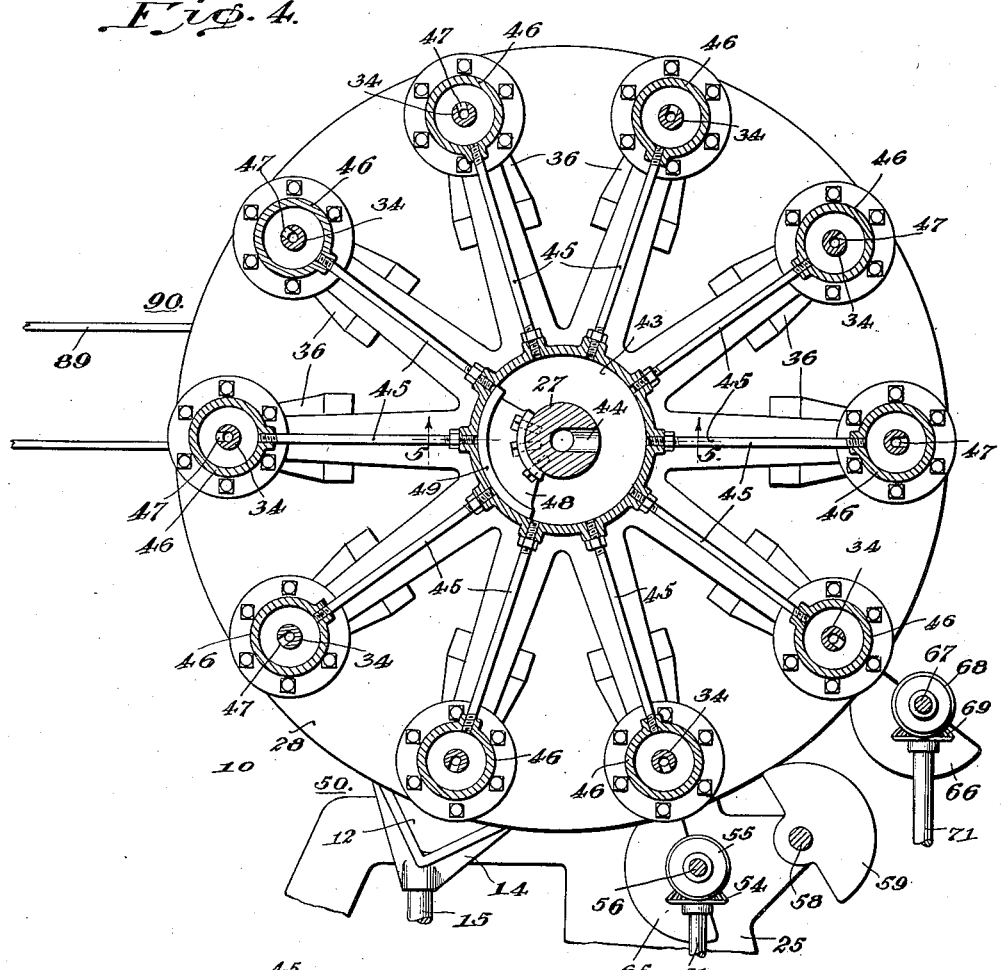
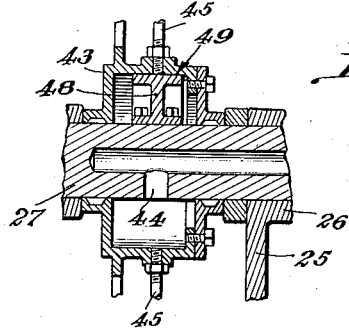
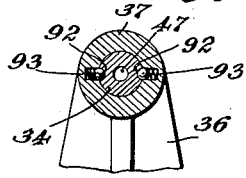
INVENTORS.
J. R. Hoge
L. D. Soubier
L. O. Mankin
BY
Rule & Hoge
ATTORNEYS.

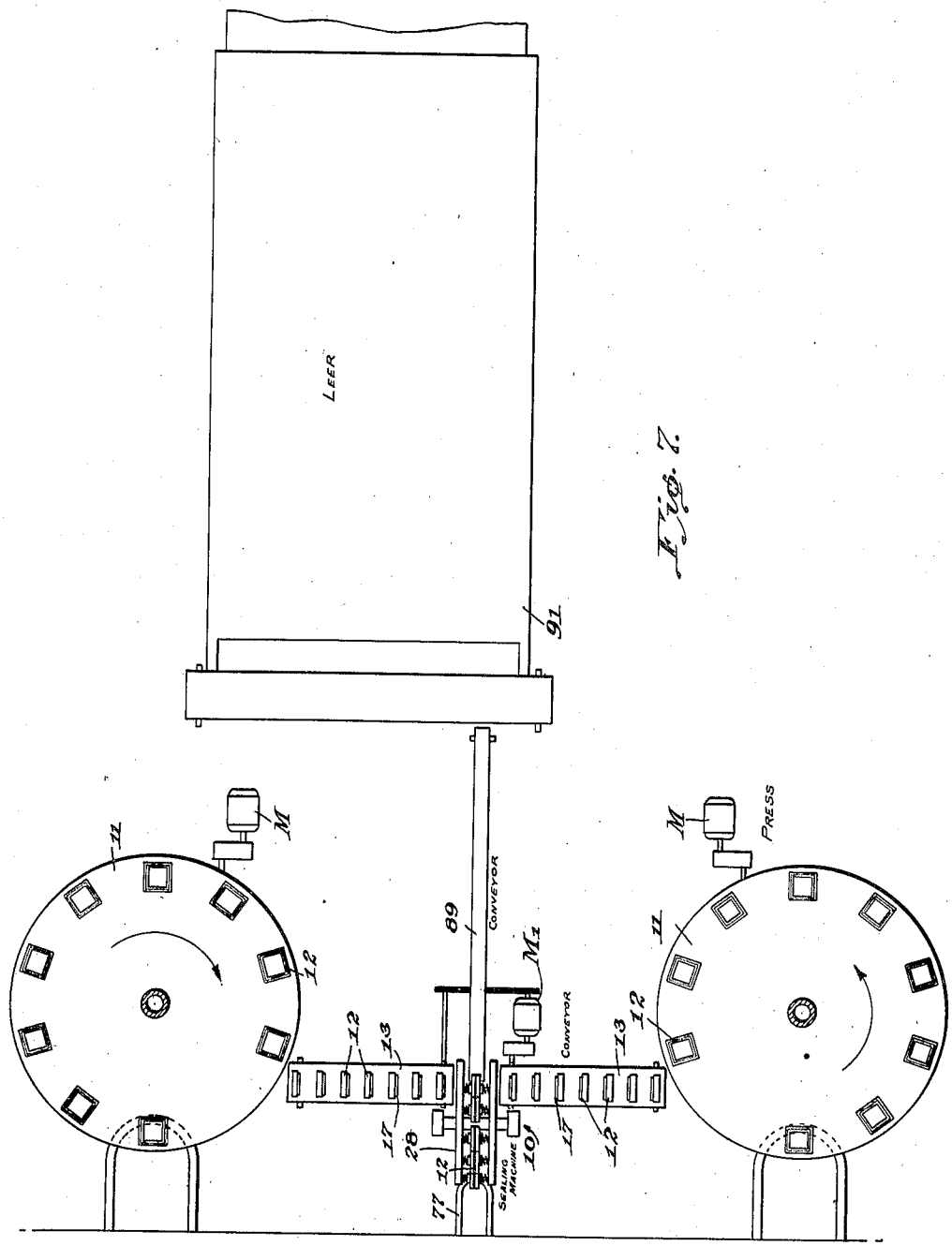

Patented Dec. 12, 1939

2,182,986

UNITED STATES PATENT OFFICE 2,182,986

METHOD AND AUTOMATIC DEVICE FOR SEALING GLASS BLOCK HALVES TOGETHER

John R. Hoge, Leonard D. Soubier, and Lawrence O. Mankin, Toledo, Ohio, assignors to Owens-Illinois Glass Company, a corporation of Ohio Application October 31, 1936, Serial No. 108,612

17 Claims. (Cl. 49—1)

The present invention relates to glassware forming machines, and more particularly to an apparatus for joining together the edges of preformed sections of structural hollow glass building blocks to form the completed article.

In carrying out the principles of the invention, the edges of the sections that are to be joined together are in the forming operation provided with coextensive recesses or grooves extending therearound which, in the assembly operation, when the edges are brought together, cooperate to form therebetween a continuous channel that extends around the exterior of the block in the vicinity of the meeting edges thereof.

The principal object of the invention is to provide an apparatus which is entirely automatic in its operation and which will successively and continuously receive the preformed sections that are to be joined together as the sections issue from the forming dies of a glass block forming machine; which will bring together under pressure the edges of the sections that are to be united, while still hot from the forming operation, in such a manner that the grooves formed therein cooperate to form the continuous channel above referred to which extends completely around the block at the meeting edges thereof; which will effectively reheat the meeting edges of the block sections in the vicinity of the channel; and which will finally introduce a thread or ribbon of molten glass into the channel to permanently unite the sections and form the completed, hollow, hermetically sealed and at least partially vacuumized structural glass building blocks.

Another object of the invention is to provide such an apparatus in which the molten glass that is employed for joining the meeting edges of the block sections is continuously and uniformly drawn in ribbon form by a steady pull of the glass upwardly from a supply of molten glass by an upward movement of the sections during application of the glass in such ribbon form to the meeting edges of the sections.

Other objects of the invention, not at this time enumerated, will become apparent hereinafter.

In the accompanying drawings forming a part of this specification:

Fig. 4 is a sectional view taken substantially along the line 4—4 of Fig. 2;

Fig. 5 is a sectional view taken substantially along the line 5—5 of Fig. 4;

Fig. 6 is a sectional view taken substantially along the line 6—6 of Fig. 2; and Fig. 7 is a top plan view, diagrammatic in its representation, of a factory layout, showing the sealing apparatus, the manner in which the glass block sections are delivered thereto from the forming machines, and the manner in which the completed blocks are discharged therefrom and conveyed to the annealing leer.

Figure 1:
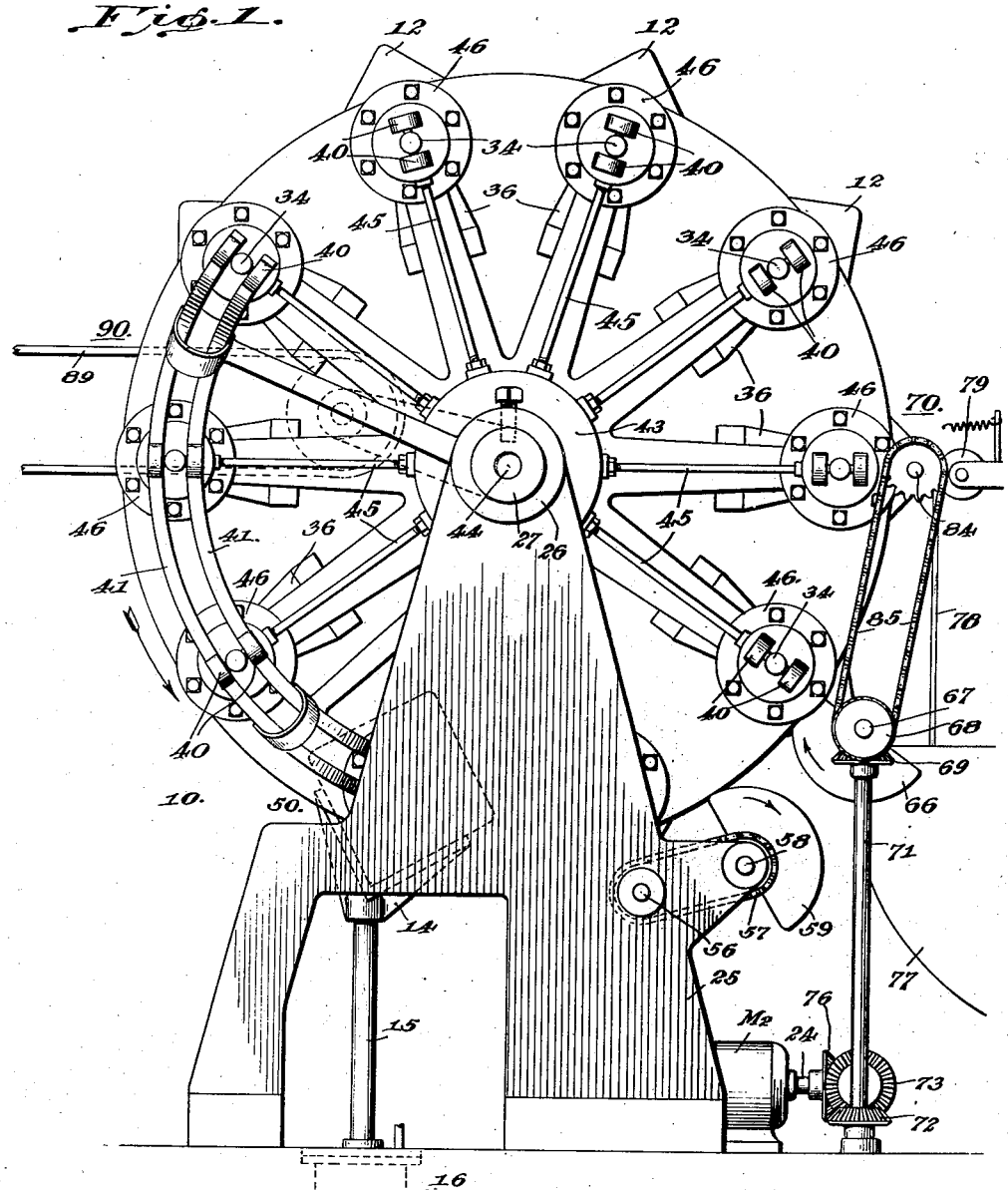
Fig. 1 is a side elevational view of an apparatus for sealing glass block sections in accordance with the principles of the present invention.

Referring now to Fig. 7, the sealing machine 10 is disposed between a pair of forming machines 11 of conventional design in which charges of molten glass are formed into half-sections 12 of the finished blocks and are delivered to respective conveyors 13 by means of which the half-sections are conducted to the sealing machine 10 from opposite sides thereof. The forming machines 11, conveyors 13 and sealing machine 10 are driven in timed relation in such a manner that the block half-sections 12 formed in the machines 11 are delivered in pairs simultaneously to the conveyor 13, the blocks of each pair arriving at the sealing machine simultaneously from opposite sides thereof. Any suitable means for effecting synchronism of the forming machines 11, conveyors 13 and sealing machine 10 may be employed. In the present instance the electric motors M which drive the forming machines 11 may be connected together in a synchro-phase circuit in which are included the motor M₁ which drives the conveyors 13 and the motor M₂ which drives the sealing machine 10.

The half-sections 12 which arrive at the sealing machine 10 simultaneously in pairs are removed from the conveyors 13 and are placed in a cradle-like support 14 carried at the outer end of a plunger 15 which extends into a cylinder 16 suitably positioned and supported below the level of the floor or surface upon which the machine proper is supported.

The half-sections 12 issuing from the forming machines 11 are substantially identical in form and each consists in a cup-shaped section of substantially rectangular proportions having a continuous external groove 17 extending around the rectangular rim thereof and providing an outwardly facing shoulder 18 which, when two sections are placed in juxtaposition in bonding position, form an annular channel 19 adjacent the meeting edges of the sections.

Figure 3:
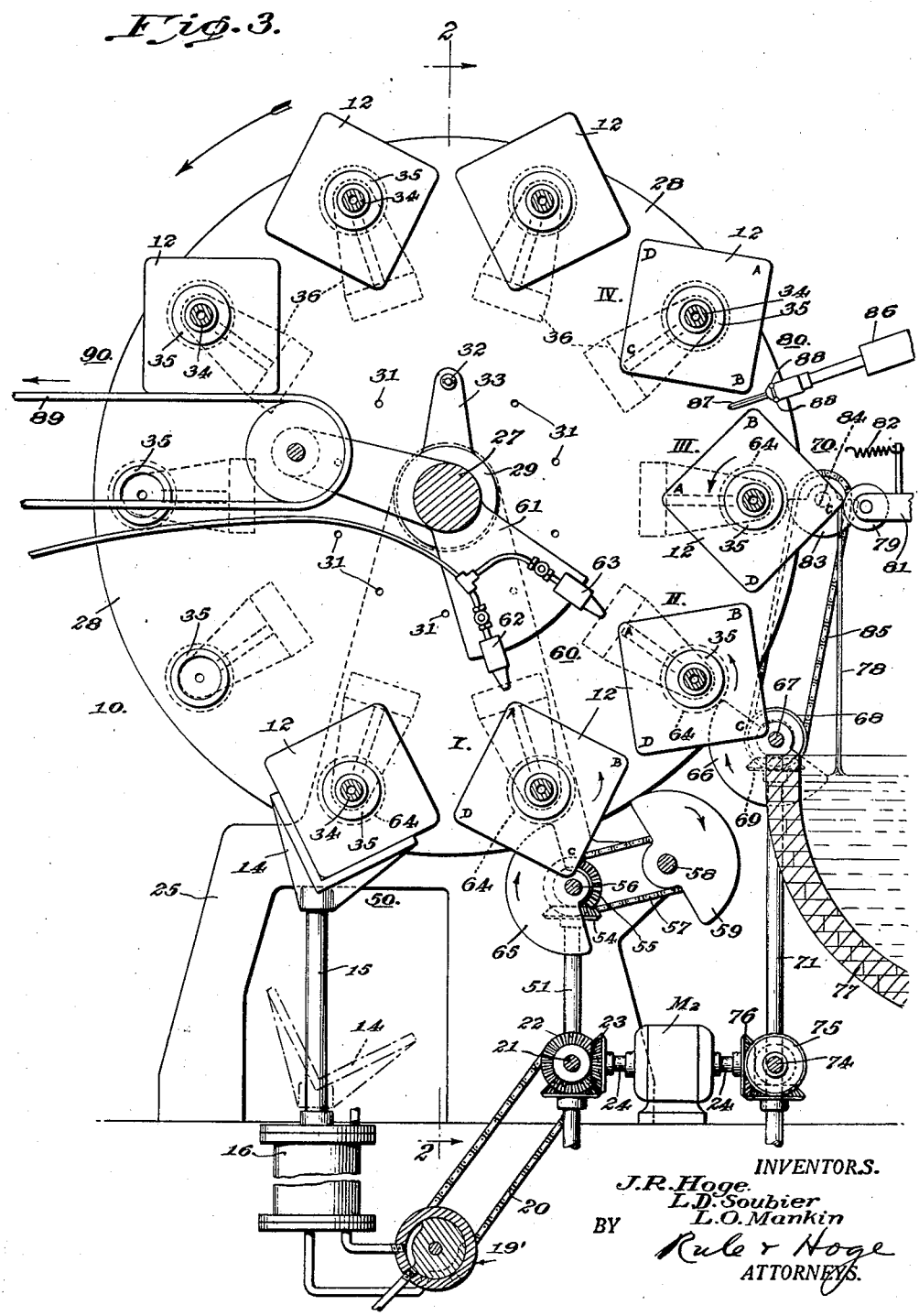
Fig. 3 is a sectional view taken substantially along the line 3—3 of Fig. 2.

Referring now to Fig. 3, movement of the plunger 15 is controlled by a rotary valve mechanism 19' which is actuated through a chain and sprocket mechanism 20, horizontal shaft 21, and meshing bevel gears 22 and 23, from the driving shaft 24 of the electrical motor M2, which, as previously described, is synchronized with the motors M and the motor M1, which drive the forming machines 11 and conveyors 13 respectively.

Successive pairs of block sections 12 are transferred from the conveyors 13 and are juxtapositioned on the support 14 when the plunger 15 is in its lowermost or retracted position in such a manner that the edges thereof to be joined together face and oppose each other in alignment. Immediately thereafter, due to actuation thereof by the valve mechanism 19', the plunger 15 is elevated or extended from the dotted line position shown in Fig. 3 to the full line position thereof to present the opposed block sections thereof to the operative conveying and sealing mechanism disposed thereabove which comprises the machine proper.

Figure 2:
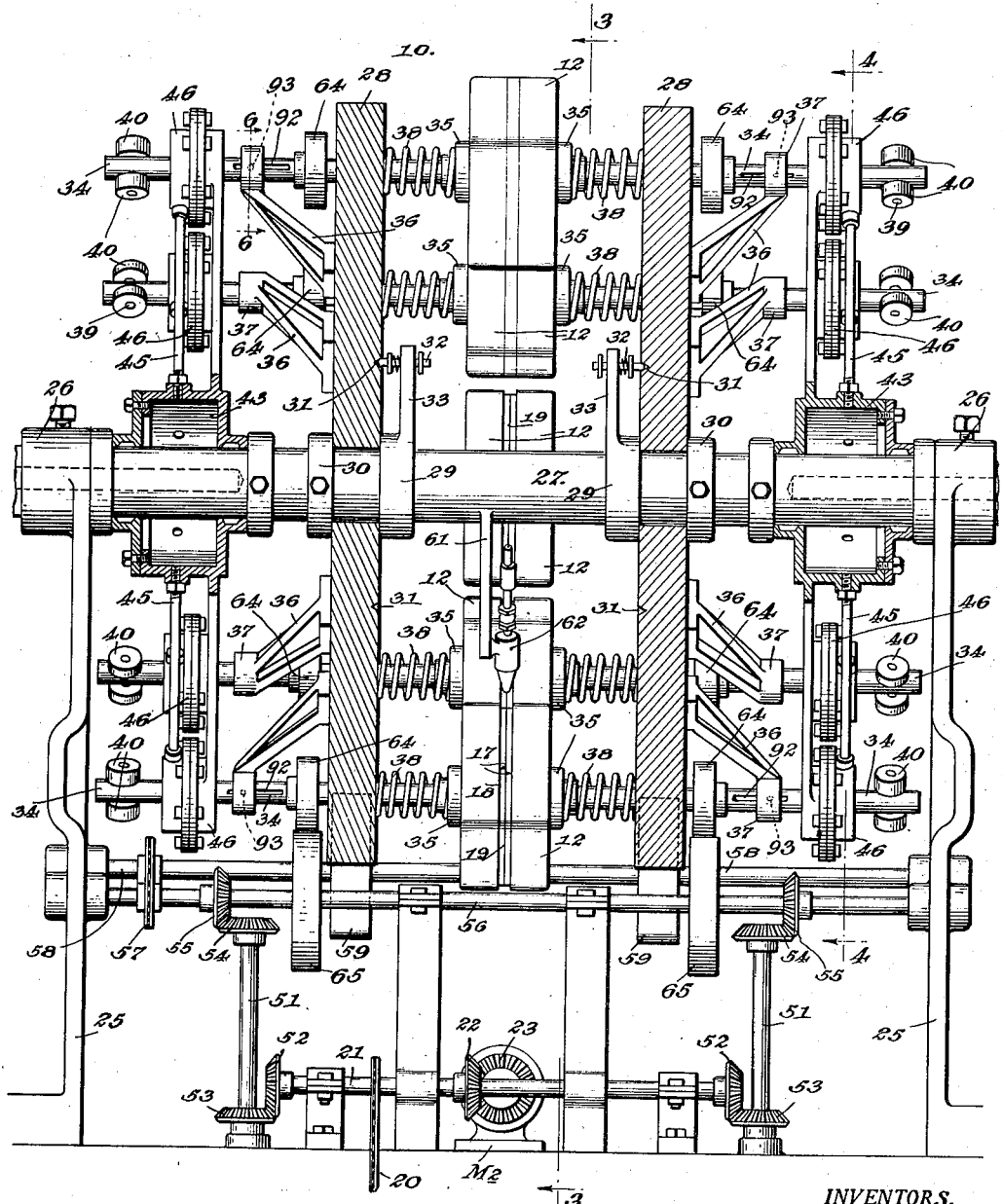
Fig. 2 is a vertical sectional view taken substantially along the line 2—2 of Fig. 3.

The machine proper consists of a pair of supports 25 or standards (Fig. 2) carrying at their upper ends a pair of axially aligned supports 26, between which there is supported a hollow horizontal shaft 27. The shaft 27 is nonrotatable, it being keyed or otherwise secured in the supports 26. Supported medially of the shaft 27 in spaced relationship on opposite sides of the center thereof is a pair of rotatable chuck-supporting plates 28. The plates 28 are held against lateral shifting on the shaft 27 by means of internal and external thrust collars 29 and 30 respectively. Each chuck supporting plate 28 is provided with a plurality of spaced indexing holes 31 designed to cooperate with respective holding pins 32 carried by extensions 33 formed on the collars 29 to maintain the chuck-supporting plates 28 in any one of a series of indexed positions.

Rotatably extending through the chuck-supporting plates 28 at spaced points therearound and at equal radial distances from the axes thereof, are a plurality of axially slidable hollow chuck-supporting plungers 34 carrying vacuum chucks 35 at their inner opposed ends. The plungers 34 of each supporting plate 28 are aligned with the plungers of the other plate and thus the chucks 35 carried by each aligned pair of plungers 34 oppose each other in alignment. Supporting brackets 36 provided with bearings 37 at their outer ends, through which the plungers 34 extend, are secured to the supporting plates 28 and assist in maintaining the plungers in their proper position of parallelism. Relatively powerful coil springs 38 disposed between the supporting plates 28 and the chucks 35 serve to normally urge the plungers 34 and chucks 35 carried thereby inwardly toward each other to support the pairs of juxtapositioned half-sections 12 therebetween.

The chucks 35 are adapted to receive the juxtapositioned pairs of half-sections 12 therebetween at a receiving station 50 (Fig. 1) and, upon indexing of the chuck supporting plates 28, to convey the same from the receiving station 50 to a heat applying station 60 wherein a flame is applied to the contiguous edges of the half-sections to be sealed. Upon further indexing operations of the chuck supporting plates 28, the juxtapositioned half-sections 12 are conveyed to a sealing station 70 wherein a thread or ribbon of molten bonding material such as molten glass, is applied to the channels 19 existing between the opposed shoulders 18 of the pairs of juxtapositioned block sections. Upon still further indexing operations of the chuck supporting plates 28, the sealed blocks are conveyed past a ribbon severing station 80 to a discharging station 90 where the completed blocks are released by the chucks 35 and are conveyed from the machine.

In order to permit the plungers 34 to be moved inwardly toward each other under the action of the coil springs 38 to engage the pairs of juxtapositioned half-sections 12 therebetween in the vicinity of the receiving station 50, the outer ends of the plungers 34 are provided with cross pins 39 carrying rollers 40 at the ends thereof. Prior to the arrival of the chucks 35 at the receiving station 50, the rollers 40 are adapted to ride outwardly on a pair of spaced stationary arcuate tracks 41 which extend in the path of the rollers 40 from a region in the vicinity of the discharging station 90 to a region in the vicinity of the receiving station 50. Thus, immediately prior to the arrival of each pair of chucks 35 at the receiving station 50, the chuck supporting plungers 34 and chucks 35 are held in their retracted position. As each pair of aligned vacuum chucks arrives at the receiving station, the rollers 40 ride inwardly on the tracks 41. The plungers 34 are thus moved inwardly under the action of the coil springs 38 in such a manner that the opposed chucks 35 engage therebetween the pair of juxtapositioned half-sections 12 carried by the cradle-like support 14 and firmly bring the adjacent opposed edges of the sections together under pressure. The movement of the rotary valve 19' which controls the movement of the plunger 15 into and out of the cylinder 16 is so timed that immediately after one pair of aligned vacuum chucks engages a pair of juxtapositioned half-sections 12 therebetween, the plunger 15 is retracted into the cylinder 16, thus lowering the cradle-like support 14 and leaving the half-sections 12 suspended between the vacuum chucks 35.

The chucks 35 are fixed on the inner ends of their respective plungers 34 and consequently they are rotatable therewith. The half-sections 12 are thus rotatably supported between the chucks 35 about a central axis transverse to the two end faces of the block sections. In order to apply a vacuum to the chucks 35 and maintain the sections 12 against shifting from their centered position to a position of eccentricity, a pair of vacuum chambers 43 or manifolds (Figs. 2 and 4) are rotatably mounted on on the hollow shaft 27 and communicate through ducts 44 with the interior thereof. A series of radially extending vacuum conduits 45 connect the vacuum manifolds 43 with a plurality of circumferentially disposed spaced vacuum chambers 46 through which chambers the circumferentially disposed hollow chuck-supporting plungers 34 extend and in which they are rotatably mounted. Each vacuum chamber 46 communicates with the interior of the respective plunger 34 which extends therethrough by means of a duct 47 and thus vacuum may be applied to the chucks 35 from a suitable source of vacuum (not shown) through the hollow supporting shaft 27, vacuum manifolds 43, conduits 45, vacuum chambers 46, and hollow plungers 34.

In order that vacuum may be applied to the vacuum chucks 35 in the vicinity of the receiving station 50 and discontinued in the vicinity of the discharging station 90, a stationary valve member 48, generally in the form of a cylindrical segment having a curved outer surface 49 of substantially the same radius of curvature as the radius of curvature of the interior of the vacuum chambers 43, is disposed in each vacuum chamber 43 and is secured to the hollow supporting shaft 27. The curved surfaces 49 of the valve members 48 are designed to successively close off communication between the vacuum conduits 45 and the interior of the vacuum manifold 43 and thus shut off the supply of vacuum to the chucks 35 as the chucks arrive at the discharging station 90. Similarly, communication between the conduits 45 and the interior of the vacuum manifold 43 is reestablished as the chucks 35 arrive at the receiving station 50.

Referring now to Fig. 3, in order to index the chuck supporting plates 28 in unison to move the half-sections carried between the vacuum chucks 35 from the receiving station 50 to the heat-applying station 60, from the heat applying station 60 to the sealing station 70, and from the sealing station 70 past the ribbon severing station 80 to the discharging station 90, a pair of vertically disposed shafts 51 are driven through meshing bevel gears 52 and 53 from the horizontal shaft 21 which is driven in the manner previously described from the motor M2. The vertical shafts 51 transmit rotary motion through meshing bevel gears 54 and 55 to a horizontal shaft 56 which in turn transmits motion through a chain and sprocket mechanism 57 to a second horizontal shaft 58. Mounted on the horizontal shaft 58, medially of its ends and in radial alignment with the chuck-supporting plates 28, are a pair of indexing segments 59 designed to engage the peripheries of the respective supporting plates 28 with which they are in radial alignment and, upon continued rotation of the shaft 58, intermittently index the supporting plates 28 in the direction of the indicating arrows. The peripheral extent of the indexing segments 59 is determined by the number of vacuum chucks employed. In the present instance, since ten such vacuum chucks have been disclosed, the extent of the periphery of each indexing segment 59 is such that each rotation of the shaft 58 will impart to the supporting plates 28 rotational movement throughout an arc of thirty-six degrees, or, in other words, one-tenth of a revolution.

Immediately after reception of a pair of half-sections 12 at the receiving station 50 between a pair of opposed chucks 35 in the manner previously described, the first indexing operation of the supports 28 operates to move the aligned and juxtapositioned half-sections 12 from the receiving station 50 to the heat applying station 60 wherein a flame is applied to the contiguous edges of the sections and to the channel 19 formed between the opposing shoulders 18 thereof. Accordingly, a supporting bracket 61 or plate formed on the hollow supporting shaft 27 extends downwardly into the vicinity of the heat applying station 60 and serves to support thereon a pair of torches 62 and 63, the flame applying nozzles of which direct a flame into the channel 19 provided between the shoulders 18 of the sections 12 and heat the surrounding glass in the vicinity of the channel 19 to reduce the same to a semi-plastic state.

In order that the heat from the flame provided by the first torch 62 may be evenly applied to the channel 19, means are provided for uniformly rotating the vacuum supporting chucks 35 throughout an arc of three hundred and sixty degrees while the block sections 12 are exposed to the flame from this torch. Toward this end, each of the hollow plungers 34 has mounted thereon a friction disk 64 designed for peripheral contact with a pair of chuck-rotating segments 65 mounted on the horizontal shaft 56. The rotary movements of the segments 65 are timed with the rotary movements of the chuck-supporting plate-indexing segments 59 through the various driving connections therebetween in such a manner that the segments 65 and 59 come into operation alternately. Thus, after each indexing operation of the chuck-supporting plates, immediately after a pair of block sections 12 are brought into the range of, and are exposed to, the flame issuing from the first torch 62, as indicated by the position designated at I, the rotating segments 65 operate to engage the peripheries of the friction disks 64 and cause uniform rotation of the chucks 35 throughout an angle of three hundred and sixty degrees. During such rotation of the chucks 35, heat is progressively applied by the flame issuing from the torch 62 to the channel 19 between the block sections 12 along the sides AB, BC, CD, and DA thereof. Immediately after the chuck-rotating operation of the segments 65, the indexing segments 59 again become operative to rotate the chuck-supporting plates 28 throughout an angle of thirty-six degrees and the juxtapositioned half-sections 12 are moved from the position indicated at I to the position indicated at II wherein the sections are brought into the range of and are exposed to the flame issuing from the second torch 63.

In order that the heat from the flame provided by the second torch 63 may be evenly applied to the channel 19 to still further raise the temperature of the surrounding glass and reduce the same to a semiplastic condition, additional chuck-rotating means is provided for uniformly rotating the vacuum chucks 35 throughout an angle of three hundred and sixty degrees while the block sections are exposed to the flame from the second torch 63. Accordingly, the friction disks 64 are designed for peripheral contact with a pair of chuck-rotating segments 66 mounted on a horizontal shaft 67 which is operatively connected through bevel gears 68 and 69 to a vertical shaft 71 which is in turn driven through bevel gears 72 and 73 (Fig. 1) from a horizontal shaft 74 geared to the motor shaft 24 through bevel gears 75 and 76. The chuck-rotating segments 66 are substantially identical with the segments 65 and likewise are adapted to come into operation alternately with the indexing segments 59 which index the chuck-supporting plates 28. Thus, after each indexing operation of the chuck-supporting plates, immediately after a pair of block sections 12 are brought into the range of the flame issuing from the second torch 63, as indicated by the position II, the chuck-rotating segments 66 operate to engage the peripheries of the friction disks 64 and cause uniform rotation of the chucks 35 throughout an angle of three hundred and sixty degrees. During such rotation of the chucks 35, heat is progressively applied by the flame issuing from the torch 63 to the channel 19 along the sides AB, BC, CD, and DA thereof. The surrounding glass in the vicinity of the channel 19, having already been heated by the flame issuing from the first torch 62, is thus reduced to a plastic state by the action of the flame issuing from the torch 63 and the edges of the sections 12 are in proper condition for the application of the bonding material thereto. Immediately after the chuck-rotating operation of the segments 66, the indexing segments 59 again become operative to rotate the chuck-supporting plate throughout an angle of thirty-six degrees and the half-sections 12 whose edges have been rendered semi-plastic by the action of the heat applied thereto are moved from the position indicated at II to the position indicated at III wherein the sections are brought to the sealing station 70.

The sealing station 70 is located directly above, or above and slightly to one side of a suitable source of molten glass, as for example, a furnace forebay 77. A thread or ribbon 78 of glass is applied to the channel 19 existing between the spaced shoulders 18 provided on the particular half-sections 12 undergoing treatment at the sealing station 70. The ribbon 78 is drawn from the supply of glass in the forebay 77 and is automatically applied by the apparatus to the channel 19 along the side BC of the sections as they approach the position indicated at III. Accordingly an ironing roller 79, mounted on one end of a plunger 81, is designed for contact with the juxtapositioned sections 12 in the region of the channel 19 thereof and toward this end a spring 82 serves to normally urged the plunger 81 and roller 79 inwardly onto the sections. As each pair of sections 12 approaches the position III, the roller 79 rides inwardly along a side AB of a partially sealed pair of sections 12, applying the ribbon 78 thereto, in a manner that will presently appear. When the roller 79 reaches the corner B of the side AB of the sections just referred to, it leaves the corner B and moves onto the corner B of the next adjacent pair of sections which have just left the heat applying station 60. The ribbon 78 is thus carried from one pair of block sections 12 to the next adjacent pair of sections and is applied to the channel 19 of the latter pair of sections commencing with the corner B thereof and ending with the corner C thereof when the sections arrive at the position indicated at III.

At the position III, means are provided for rotating the sections 12 throughout an angle of one hundred and eighty degrees to cause the sides CD and DA to be successively exposed to the action of the roller 79 which forces or wraps, so to speak, the ribbon 78 around the sections and into the channel 19, to further apply the ribbon 78 thereto. Such rotation is accomplished by the provision of a relatively small chuck-rotating segment 83 which is mounted on a horizontal shaft 84 which is connected by a chain and sprocket mechanism 85 to the shaft 67 in such a manner as to come into operation simultaneously with the operation of the chuck-rotating segment 66, and consequently alternately with the operation of the segment 59 which indexes the chuck-supporting plates 28. The chuck-rotating segment 83 is designed for peripheral contact with the friction disks 64 by means of which the chucks 35 are rotated.

At the completion of the operation just described, the ribbon 78 has been applied to the channel 19 along three sides of the sections, namely the sides BC, CD and DA with the roller 79 occupying the position in which it appears in Fig. 3, but in contact with the corner A instead of the corner C as shown. Immediately after the chuck-rotating operation of the segments 83, the indexing segments 59 again become operative to rotate the chuck-supporting plates 28 throughout an angle of thirty-six degrees and the partially joined juxtapositioned sections are moved from the position just described at III to the position indicated at IV. As the sections 12 proceed from the sealing position to the position indicated at IV, the roller 79 rides onto the side AB of the sections and forces the ribbon 78 into the channel 19 along this side, thus completing the ribbon applying and bonding operation.

In moving from the position indicated at III with the corner A of the sections in contact with the roller 79, to the position indicated at IV, the roller 79 after traversing the side AB to complete the ribbon applying operation on one pair of sections 12, leaves the corner B of the bonded sections and moves onto the corner B of the next succeeding unbonded pair of sections 12, as previously indicated, carrying with it the ribbon 78 and the complete bonding operations described above are carried out on this latter pair of sections.

In the position indicated at IV, the connecting ribbon between the top pairs of sections in the respective positions indicated at III and IV is severed at the severing station 80 and one loose end thereof is ironed onto the corner B of the unbonded sections while the other loose end thereof is ironed onto the corner B of the bonded sections. The severing of the ribbon 78 and the ironing of the loose ends thereof is accomplished by means of a plunger 86 carrying at its outer end a suitable cut-off mechanism 87 and provided with a pair of ironing plates 88 on opposite sides thereof immediately behind the cut-off mechanism. Movement of the plunger 86 is synchronized with the movement of the chuck-supporting plates 28 in such a manner that upon arrival of a pair of sections at the position indicated at IV, the plunger 86 is advanced, the cut-off mechanism 87 operating to sever the ribbon 78 and the ironing plates 88 operating to iron and smooth the loose ends of the ribbon onto the adjacent pairs of sections 12.

After the ribbon 78 has been severed at the severing station 80, further indexing operations of the chuck-supporting plates 28 move the bonded sections toward the discharging station 90. Several indexing operations are required to move the blocks from the severing station 80 to the discharging station 90 and thus the glass in the vicinity of the applied ribbon has an opportunity to cool before the blocks are discharged from the machine.

Referring now to Fig. 1, one end of an endless conveyor 89 extends into the vicinity of the discharging station 90 to receive the discharged blocks thereon and convey the same to an annealing leer 91 (Fig. 7). Accordingly, upon arrival of the blocks at the discharging station, the supply of vacuum to the chucks 35 is shut off by the valve member 48 as previously described and the rollers 40 of the aligned pairs of plungers 34 are engaged by the inclined portions of the arcuate tracks 41 on opposite sides of the chuck-supporting plates 28 and are moved outwardly, thus moving the aligned plungers 34 outwardly away from each other and causing the chucks 35 to disengage the blocks carried therebetween. The blocks, thus released, are deposited on the conveyor 89 from whence they are conducted to the annealing leer 91.

In order that the rollers 40 shall be properly oriented with respect to the tracks 41 as the block supporting instrumentalities arrive at the discharging station 90, and also in order that the tangentially directed pressure of the roller 79 on the sides of the juxtapositioned block sections 12 at the sealing station shall not shift the angular position thereof, each chuck-supporting plunger 34 is provided with a pair of diametrically opposed longitudinally extending grooves 92 (Fig. 6) in the vicinity of its respective supporting bracket 36. A pair of spring pressed balls 93 carried by each bracket 36 are adapted to become seated in the grooves 92 to maintain the plungers 34 and chucks 35 carried thereby in their proper indexed positions as determined by the various indexing segments 65, 66 and 83. The cross pins 39 which carry the rollers 40 thereon are mounted on the outer ends of the plungers 34 so as to extend in, or occupy, the common plane occupied by the longitudinally extending grooves 92. Thus, as the ends of the plungers 34 approach the uppermost ends of the arcuate cam tracks 41, the rollers 40 will be properly oriented for proper engagement and cooperation with the tracks 41.

It is significant that in the operation of the machine, the ribbon 78 is continuously drawn from the forebay 77 at a constant rate of speed which is not affected by the transfer of the ribbon from one pair of half-sections to another. Because of this fact, the ribbon 78 will be of a uniform size suitable for application to the channels 17 existing at the juncture between the block half-sections. Such uniformity of drawing of the ribbon 78 is attained as a matter of proportion in designing the machine. To maintain the uniform draw referred to, it is essential that the radius of the segments 83, the radius of the segments 59, the radius of the chuck-supporting plates 28, and the distance from the axis of the chuck-supporting plates 28 to the plungers 34, bear a definite proportional relation to each other in order that the linear rate of speed of the outer corner C of the block sections about the axis of the chucks 35 when the chucks are rotated by the segments 83 at the sealing station 70, will equal the linear rate of speed of the outer corner A about the axis of the chuck-supporting plates when the plates are indexed by the segments 59.

Modifications may be resorted to within the spirit and scope of the appended claims.

We claim:

1. In a machine for sealing the edges of preformed sections of hollow glass building blocks, movable means for supporting a plurality of pairs of juxtapositioned block sections the edges of which are in contact and for urging said sections toward each other under pressure, means for producing a flame, and means for moving said supporting means and pairs of block sections supported thereby bodily and successively past said flame producing means with the flame thereof directed onto the sections in the vicinity of the meeting edges thereof to render the glass in the vicinity of said edges plastic.

2. In a machine for sealing the edges of preformed sections of hollow glass building blocks, movable means for rotatably supporting a pair of juxtapositioned block sections the edges of which are in contact and for urging said sections toward each other under pressure, means for producing a flame, means for indexing said supporting means to bring the block sections into the vicinity of said flame producing means with the flame thereof directed onto the sections in the vicinity of the meeting edges thereof, means for rotating said sections while in the vicinity of said flame producing means, means for indexing said supporting means to bring the meeting edges of said sections into contact with a ribbon of molten glass drawn from a pool thereof, and means for rotating said sections to further draw said ribbon from said pool and apply the same to said meeting edges.

3. In a machine for sealing the edges of preformed sections of hollow glass building blocks, movable means for rotatably supporting a pair of juxtapositioned block sections the edges of which are in contact and for urging said sections toward each other under pressure, means for producing a flame, means for indexing said supporting means to bring the block sections into the vicinity of said flame producing means with the flame thereof directed onto the sections in the vicinity of the meeting edges thereof, means for rotating said sections while in the vicinity of said flame producing means, means for indexing said supporting means to bring the meeting edges of said sections into contact with a ribbon of molten glass drawn from a pool thereof and to further draw said ribbon from said pool, means for applying said ribbon thus drawn to said meeting edges throughout a portion thereof, and means for rotating said sections to further draw and apply the ribbon to the meeting edges thereof.

4. In a machine for sealing the edges of preformed sections of hollow glass building blocks, movable means for rotatably supporting a pair of juxtapositioned block sections the edges of which are in contact and for urging said sections toward each other under pressure, means for bodily moving said supporting means to bring the meeting edges of said sections into contact with a ribbon of molten glass drawn from a pool thereof, and means for rotating said sections to further draw said ribbon from said pool and apply the same to said meeting edges.

5. In a machine for sealing the edges of preformed sections of hollow glass building blocks, means for rotatably supporting a pair of juxtapositioned block sections the edges of which are in contact and for urging said sections toward each other under pressure, a pool of molten glass from which a ribbon of molten glass has been drawn from a previous sealing operation, means for moving said supporting means to bring the meeting edges of said sections into contact with said ribbon, means for rotating said sections to further draw said ribbon from said pool and apply the same to said meeting edges, and means for severing the ribbon thus drawn from the sections.

6. In a machine for continuously sealing the edges of preformed rectilinear sections of hollow glass building blocks, a pair of spaced axially aligned rotatable chuck-supporting plates, a plurality of spaced pairs of axially aligned plungers carried by said plates, chucks carried by the inner opposed ends of each pair of plungers, means normally urging the plungers of each pair toward each other to cause said chucks to engage therebetween a pair of juxtapositioned block sections the edges of which are in contact, means for periodically indexing said plates in unison to rotate the same throughout a predetermined angle and convey the juxtapositioned sections carried by said chucks in succession from a receiving station to a heat applying station, from the heat applying station to a sealing station, and from the sealing station past a severing station to a discharging station, means synchronized with the movement of said plates for supplying juxtapositioned building block sections to said chucks at said receiving station, means for directing a flame onto said sections in the vicinity of the meeting edges thereof at said heat applying station, means for rotating said chucks and sections carried thereby at said heat applying station, means operable in the vicinity of said sealing station during an indexing operation of said plates for applying a ribbon of molten glass to said sections at the meeting edges thereof along one side thereof, means for rotating said chucks and sections carried thereby through an angle of one hundred and eighty degrees at said sealing station to apply said ribbon to the meeting edges of said sections along the next adjacent side and the side opposite said first mentioned side of said sections, means operable in the vicinity of said sealing station during a succeeding indexing operation of said plates for applying said ribbon to said sections at the meeting edges thereof along the remaining side thereof, means for severing said ribbon from said sections at said severing station, and means for moving said plungers apart to cause the chucks carried thereby to release the sealed sections carried therebetween at said discharging station.

7. In a machine for continuously sealing the edges of preformed rectilinear sections of hollow glass building blocks, a pair of spaced axially aligned rotatable chuck-supporting plates, a plurality of spaced pairs of axially aligned plungers carried by said plates, chucks carried by the inner opposed ends of each pair of plungers, means normally urging the plungers of each pair toward each other to cause said chucks to engage therebetween a pair of juxtapositioned block sections the edges of which are in contact, means for periodically indexing said plates in unison to rotate the same throughout a predetermined angle and convey the juxtapositioned sections carried by said chucks in succession from a receiving station to a heat applying station, from the heat applying station to a sealing station, and from the sealing station past a severing station to a discharging station, means synchronized with the movement of said plates for supplying juxtapositioned building block sections to said chucks at said receiving station, means for directing a flame onto said sections in the vicinity of the meeting edges thereof at said heat applying station, means for rotating said chucks and sections carried thereby at said heat applying station, means operable in the vicinity of said sealing station for securing a ribbon of molten glass to said sections at the meeting edges thereof, means for rotating said chucks and sections carried thereby at said sealing station to apply said ribbon to said meeting edges, means for severing said ribbon from said sections at said severing station, and means for moving said plungers apart to cause the chucks carried thereby to release the sealed sections carried therebetween at said discharging station.

8. The method of forming hollow glass articles from half-sections thereof which consists in continuously drawing a ribbon of molden glass upwardly from a pool of molten glass and progressively applying said ribbon to the contacting edge portions of successive pairs of said half-sections to be united.

9. The method of forming hollow glass building blocks from half-sections thereof which consists in continuously drawing a ribbon of molten glass upwardly from a pool of molten glass and progressively applying said ribbon to the contacting edge portions of successive pairs of said half-sections to be united.

10. The method of forming hollow glass articles from sections thereof to be united which consists in continuously drawing a ribbon of molten glass upwardly from a pool of molten glass while simultaneously and progressively applying said ribbon to the contacting edge portions of successive pairs of said sections to be united.

11. The method of forming hollow glass building blocks from half-sections thereof to be united which consists in continuously drawing a ribbon of molten glass upwardly from a pool of molten glass while simultaneously and progressively applying said ribbon to the contacting edge portions of successive pairs of said half-sections to be united.

12. The method of forming hollow glass building blocks which consists in contacting the edge portions of a pair of block half-sections under pressure, applying a localized flame progressively to said edge portions, drawing a ribbon of molten glass upwardly from a source of molten glass and applying said ribbon to said edge portions in overlapping relation thereto.

13. The method of joining together the contacting edge portions of sectional articles to be united which consists in drawing a ribbon of molten glass upwardly from a pool thereof, contacting said ribbon with said edge portions to cause adherence thereto, and rotating said articles to further draw said ribbon from the pool and apply the same to said edge portions.

14. The method of forming a hollow rectilinear glass building block from a pair of rectilinear half-sections thereof which consists in contacting the edge portions of said half-sections to be united to provide a block form, applying a localized flame to said contacting edge portions to render the same plastic, drawing a ribbon of molten glass from a pool of molten glass, contacting said ribbon with one corner of the block form in the vicinity of said edge portions, revolving said block form about an axis a predetermined distance to cause further drawing of said ribbon from said pool and application thereof to one side of the block form in the vicinity of said edge portions, rotating said block form throughout a predetermined angle to cause further drawing of said ribbon from said pool and application thereof to two of the remaining sides of the block form in the vicinity of said edge portions, and revolving said block form about an axis a predetermined distance to cause further drawing of said ribbon from said pool and application thereof to the last remaining side of the block form in the vicinity of said edge portions.

15. The method of forming a polygonal glass building block from a pair of symmetrical half-sections thereof which consists in contacting the edge portions of said half-sections to be united to provide a block form, applying a localized flame to said contacting edge portions to render the same plastic, drawing a ribbon of molten glass from a pool thereof, contacting said ribbon with one corner of the block form in the vicinity of said edge portions, revolving said block form about an axis a predetermined distance to cause further drawing of said ribbon from said pool and progressive application thereof to said edge portions throughout a portion of their perimetrical extent, rotating said block form throughout a predetermined angle to cause further drawing of said ribbon from said pool and further progressive application thereof to said edge portions throughout another portion of their perimetrical extent, revolving said block form about said axis a predetermined distance to cause further drawing of said ribbon from said pool and progressive application thereof to said edge portions throughout the remainder of their perimetrical extent.

16. In a machine for continuously sealing the edges of preformed rectilinear sections of hollow glass building blocks, movable means for rotatably supporting a plurality of pairs of juxtapositioned block sections, the edges of which are in contact, and for urging said sections toward each other, means for bodily moving said supporting means to convey the juxtapositioned sections in succession from a receiving station to a heat applying station, from the heat applying station to a sealing station, and from the sealing station past a severing station to a discharging station, means synchronized with the movement of said supporting means for supplying juxtapositioned building block sections thereto at said receiving station, means for successively directing a flame onto said juxtapositioned sections in the vicinity of the meeting edges thereof at said heat applying station, means for successively rotating said juxtapositioned sections at said heat applying station, means operable in the vicinity of said sealing station for successively applying a ribbon of molten glass to said juxtapositioned sections at the meeting edges thereof, means for successively severing said ribbon from said juxtapositioned sections at said severing station, and means for successively releasing the sealed sections at said discharging station.

17. In a machine for continuously sealing the edges of preformed rectilinear sections of hollow glass building blocks, movable means for rotatably supporting a plurality of pairs of juxtapositioned block sections, the edges of which are in contact, and for urging said sections toward each other, means for periodically bodily moving said supporting means in unison to convey the juxtapositioned sections in succession from a receiving station to a heat applying station, from the heat applying station to a sealing station, and from the sealing station past a severing station to a discharging station, means synchronized with the movement of said supporting means for supplying juxtapositioned building block sections thereto at said receiving station, means for directing a flame onto said sections in the vicinity of the meeting edges thereof at said heat applying station, means for rotating said sections at said heat applying station, means operable in the vicinity of said sealing station for applying a ribbon of molten glass to the meeting edges of said sections along one side thereof during an initial movement of said supporting means and for applying said ribbon to the meeting edges of said sections along an adjacent side thereof during the next succeeding movement of said supporting means, means for rotating said sections at said sealing station to cause said ribbon to be applied to the meeting edges of said sections along the two other sides thereof, means for severing said ribbon from said sections at said severing station, and means for releasing said sections at said discharging station.

JOHN R. HOGE.
LEONARD D. SOUBIER.
LAWRENCE O. MANKIN.